United States Patent
Kolletzki

(10) Patent No.: US 8,161,404 B2
(45) Date of Patent: Apr. 17, 2012

(54) VEHICLE MULTIMEDIA SYSTEM

(75) Inventor: Johannes Kolletzki, Neckartailfingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 243 days.

(21) Appl. No.: 11/212,494

(22) Filed: Aug. 26, 2005

(65) Prior Publication Data

US 2006/0171675 A1   Aug. 3, 2006

(30) Foreign Application Priority Data

Aug. 26, 2004 (EP) .................... 04020225
Aug. 26, 2004 (EP) .................... 04020226

(51) Int. Cl.
*G06F 3/048* (2006.01)
(52) U.S. Cl. ......... 715/810; 715/806; 715/853; 715/854
(58) Field of Classification Search .................. 715/810, 715/806, 853, 854
See application file for complete search history.

(56) References Cited

U.S. PATENT DOCUMENTS

| | | | |
|---|---|---|---|
| 4,862,498 A | 8/1989 | Reed | |
| 5,187,797 A | 2/1993 | Nielsen et al. | |
| 5,524,190 A * | 6/1996 | Schaeffer et al. | 715/522 |
| 5,757,371 A * | 5/1998 | Oran et al. | 715/779 |
| 5,802,300 A | 9/1998 | Tanaka et al. | |
| 6,069,614 A | 5/2000 | Singhal | |
| 6,128,006 A * | 10/2000 | Rosenberg et al. | 345/163 |
| 6,201,540 B1 * | 3/2001 | Gallup et al. | 715/764 |
| 6,700,839 B1 | 3/2004 | Auflick et al. | |
| 6,819,990 B2 | 11/2004 | Ichinose | |
| 7,035,720 B2 | 4/2006 | Taxis | |
| 7,096,431 B2 | 8/2006 | Tambata et al. | |
| 2001/0034573 A1 | 10/2001 | Morgan et al. | |
| 2001/0045965 A1 | 11/2001 | Orbanes et al. | |
| 2002/0059288 A1 | 5/2002 | Yagi et al. | |
| 2003/0098888 A1 * | 5/2003 | Guenther et al. | 345/810 |

(Continued)

FOREIGN PATENT DOCUMENTS

| | | |
|---|---|---|
| DE | 40 01 062 A1 | 7/1991 |
| DE | 198 49 328 A1 | 5/2000 |
| EP | 0 727 734 A1 | 8/1996 |

(Continued)

OTHER PUBLICATIONS

McFedries, Paul, The Complete Idiot's Guide™ to Windows® 95, Second Edition, Fig. 1-8.*

(Continued)

*Primary Examiner* — Andrey Belousov

(57) ABSTRACT

A vehicle multimedia system includes a display that displays a hierarchically structured menu. The hierarchically structured menu may have a main menu and a plurality of submenus. Each menu has at least one menu item. Upon selection and activation of the menu item, a next level of a submenu is displayed on the display. Users may operate an operating element to select and activate the menu or menu item. The vehicle multimedia system includes a memory that stores information identifying the menu or menu items. Upon activation of the menu item, the identification information may be stored in the memory. The stored information may be retrieved upon activation of the operating element such as a key, a switch, etc. Upon no selection and/or activation of the menu item for a certain time period, the main menu may be automatically displayed. Upon activation of the operating element, the vehicle multimedia system may reach a specific menu such as a last accessed menu or menu item, a menu or menu item saved by users, etc.

18 Claims, 10 Drawing Sheets

U.S. PATENT DOCUMENTS

| | | |
|---|---|---|
| 2003/0195681 A1 | 10/2003 | Rother |
| 2004/0128275 A1 | 7/2004 | Moehrle |
| 2004/0143372 A1* | 7/2004 | Taxis .............................. 701/1 |

FOREIGN PATENT DOCUMENTS

| | | |
|---|---|---|
| JP | 2004-088394 A | 3/1992 |
| JP | 2007-146629 | 6/1995 |
| JP | 10-240434 | 9/1998 |
| JP | 2003-209785 A | 7/2003 |
| JP | 2004-061523 | 2/2004 |
| WO | WO 99-49443 | 9/1999 |

OTHER PUBLICATIONS

Snyder, Microsoft Windows 95 Keyboard Guide by Maryanne K. Snyder and Gregory C. Lowney, Copyright (c) 1996 Microsoft Corporation, pp. 1-13.*

Windows XP, Microsoft® Windows XP Pro, Version 2002, Fig. 1, 2.*

Menu Selection, Anonymous, Kenneth Mason Publications, vol. 328, No. 71, Aug. 1998.

Methodology for Dynamic Menu Escalation Selection for Pull-Down Menu, IBM Technical Disclosure Bulletin, vol. 37, No. 3, Mar. 1, 1994.

Selectable Dynamic Drop-Down List Boxes, IBM Technical Disclosure Bulletin, vol. 38, No. 12, Dec. 1, 1995.

European Search Report for Application No. 04 020 225.1 dated Apr. 6, 2005.

The prosecution history of U.S. Appl. No. 11/213,509 shown in the attached patent application retrieval file wrapper document list, printed Oct. 23, 2008, including each substantive office action and applicant response.

* cited by examiner

VEHICLE MULTIMEDIA SYSTEM

PRIORITY CLAIM

This application claims the benefit of European Patent Applications Nos. 04 020 225.1 and 04 020 226.9, filed Aug. 26, 2004; each disclosure of which is incorporated herein by reference. The application is also related to U.S. patent application Ser. No. 11/213,509, filed on Aug. 26, 2005 and entitled "Vehicle Multimedia System," which is incorporated herein by reference in its entirety.

BACKGROUND OF THE INVENTION

1. Technical Field

The invention relates to a vehicle multimedia system and in particular, to a vehicle multimedia system having a display for displaying a hierarchically structured menu.

2. Related Art

Multimedia systems are commonly used in a vehicle. Vehicle multimedia systems may include components that are designed specifically for a vehicle, such as high fidelity (hereinafter, referred to "hifi") units, navigation units, and telephone units. Hifi units include, for example, amplifiers, radio tuners, and/or CD/DVD players. Navigation units include, for example, a global positioning system (GPS) device, CD/DVD as a mass storage device, and a control unit for running route guidance software. Telephone units include, for example, a global system for mobile communications (GSM) device, a Universal Mobile Telecommunications System (UMTS) device, and/or a modem to enable internet access.

Vehicle multimedia systems have become popular options upon purchase of a new vehicle. Today, vehicle multimedia systems provide more sophisticated and diverse services and functions than in the past, and the trend towards more advanced systems is increasing. Vehicle multimedia systems may be more user-friendly if they are ergonomically designed, and they contain users-oriented interface.

SUMMARY

A vehicle multimedia system provides various functions and services such as audio services, video services, and navigation services. The vehicle multimedia system may employ a hierarchically structured menu system. Users may select and activate desired services and functions by using the menu system. Users navigate the menu system from a hierarchically highest menu to a hierarchically lowest menu. Each menu may include plural menu items. Upon activation of menu items, users may automatically reach a next menu or perform functions assigned to the activated menu items.

The menu system may be structured to return to the hierarchically highest menu upon occurrence of a certain condition such as an idle condition of the vehicle multimedia system for a timeout period. The vehicle multimedia system may include a control unit and a memory. The memory stores information identifying the activated menus or menu items. Users may desire to return to a last accessed menu or menu item, or a specifically saved menu or menu items. Users may operate a predetermined operating element such as a key, a switch, etc. The control unit may retrieve the stored information from the memory and reach the last accessed menu or menu item, or the saved menu or menu item. Upon operation of the operating element, users may watch the retrieved menu or menu item displayed on a display device. Upon operation of the operating element, users may avoid repetitive menu navigation and directly access a desired menu or menu item.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
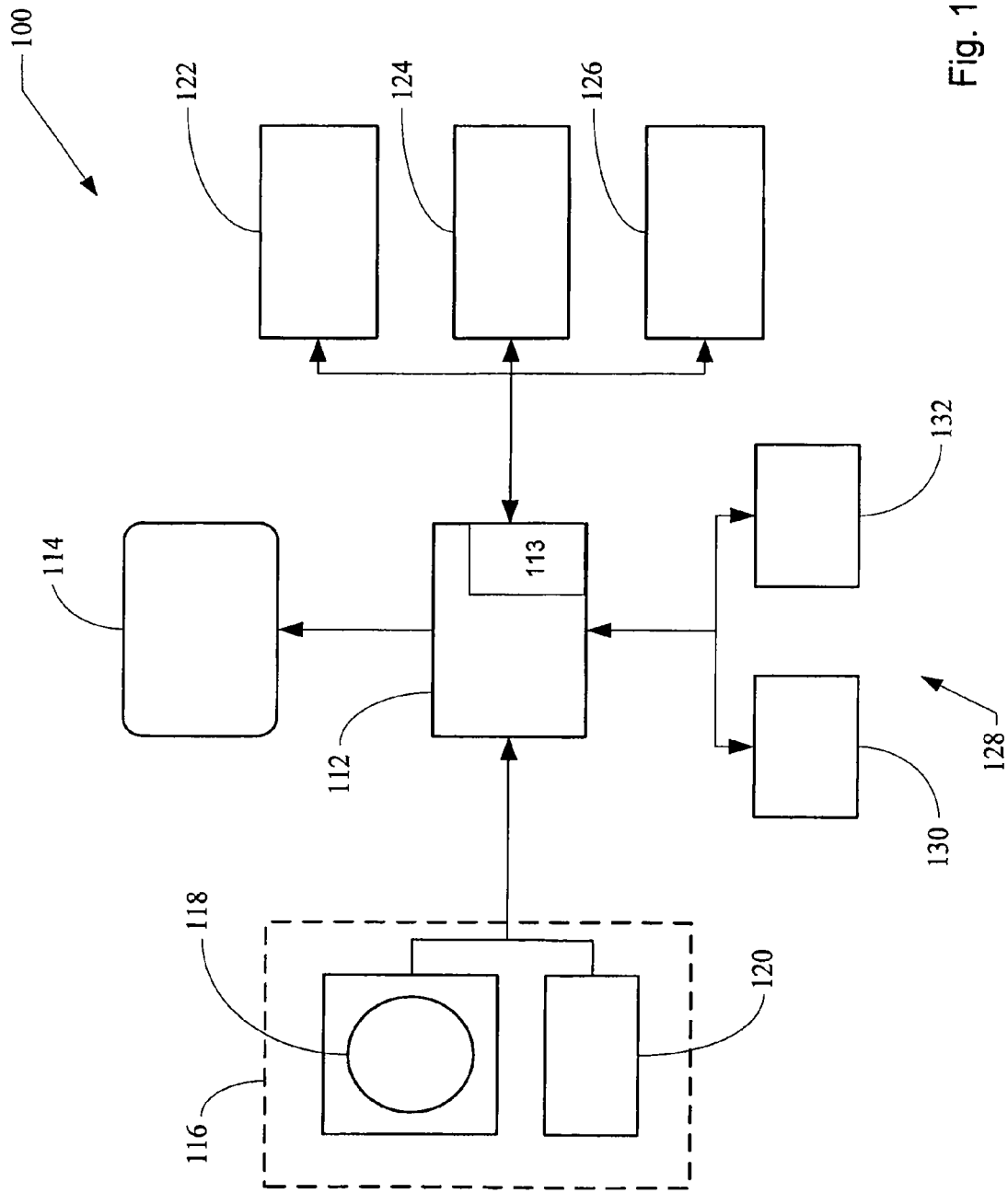
FIG. 1 is a block diagram of a vehicle multimedia system.

FIG. 1 is a block diagram illustrating a vehicle multimedia system 100. The vehicle multimedia system 100 allows users to reach a last accessed menu or menu item with a simple operation of a predetermined operating element 116. For instance, the vehicle multimedia system 100 includes a first memory element 130 that stores information identifying the last accessed menu or menu item. A memory control unit 113 may organize writing and reading of such information from and into the first memory element 130. The memory control unit 113 writes the information into the first memory element 130 when users activate a menu item to navigate a next menu. The operating element 116 may include a user programmable key, a switch, a button, etc. The memory control unit 113 reads the stored information from the first memory element 130 in response to the operation of the operating element 116. This information may be supplied to a central control unit 112 of the vehicle multimedia system 100. The central control unit 112 may reach the corresponding menu or menu item. The menu or menu item identified by the information is displayed or the function assigned to the menu item is performed.

The central control unit 112 controls the operation of the vehicle multimedia system 100. The central control unit 112 is connected with a display 114. The display 114 may be a dot matrix display, a liquid crystal display, a touch-panel display, or other display. The central control unit 112 transmits information to the display 114, which in turn presents the information to users.

The operating element 116 may include at least one switch. For example, the switch includes a rotary switch 118 and at least one push switch 120. Alternatively, or additionally, the operating element 116 may include other operating elements, such as push switches, rotary switches, rotary-push-button switches, etc. The operating element 116 also may include user programmable keys and/or user defined keys.

The vehicle multimedia system 100 further provides a hifi unit 122, a navigation unit 124, and a mobile telecommunications unit 126. The hifi unit 122 provides entertainment functions, such as a radio, CD/DVD players, a TV, etc. The hifi unit 122 includes electronic components that provide various entertainment functions. The navigation unit 124 may offer route guidance and include a global positioning system (GPS) component and a storage component for storing route information. For example, the storage component may be a DVD. The mobile telecommunications unit 126 offers telecommunication-related services, such as a telephone, internet, a short message service (SMS), e-mail, etc. The mobile telecommunications unit 126 includes a module for a global system for mobile communications (GSM) and/or an UMTS module for building a connection to a telecommunications provider.

The central control unit 112 controls functions and services offered by the hifi unit 122, the navigation unit 124, and the mobile telecommunications unit 126. Users may select desired functions and services via a hierarchically structured menu system. The vehicle multimedia system 100 may employ a menu system for selecting and activating a desired function or service. The menu system includes a plurality of menu items that may be selected and activated by users. The menu items are organized and structured hierarchically and assigned to a specific menu. For example, a menu has menu items that belong to a next higher menu item. The menu system will be described in detail below in conjunction with FIGS. 3 and 4.

The vehicle multimedia system 100 further includes a memory 128. The memory 128 includes the first memory element 130 and a second memory element 132. The first memory element 130 stores information identifying a menu, which will be described in conjunction with FIG. 5. The second memory element 132 stores general information that is necessary for operation of the vehicle multimedia system 100, such as a program code, configuration information, etc. The memory 128 may be controlled by a memory control unit 113. The memory control unit 113 may be integrated with the central control unit 112 or may function as a separate unit.

Figure 2:
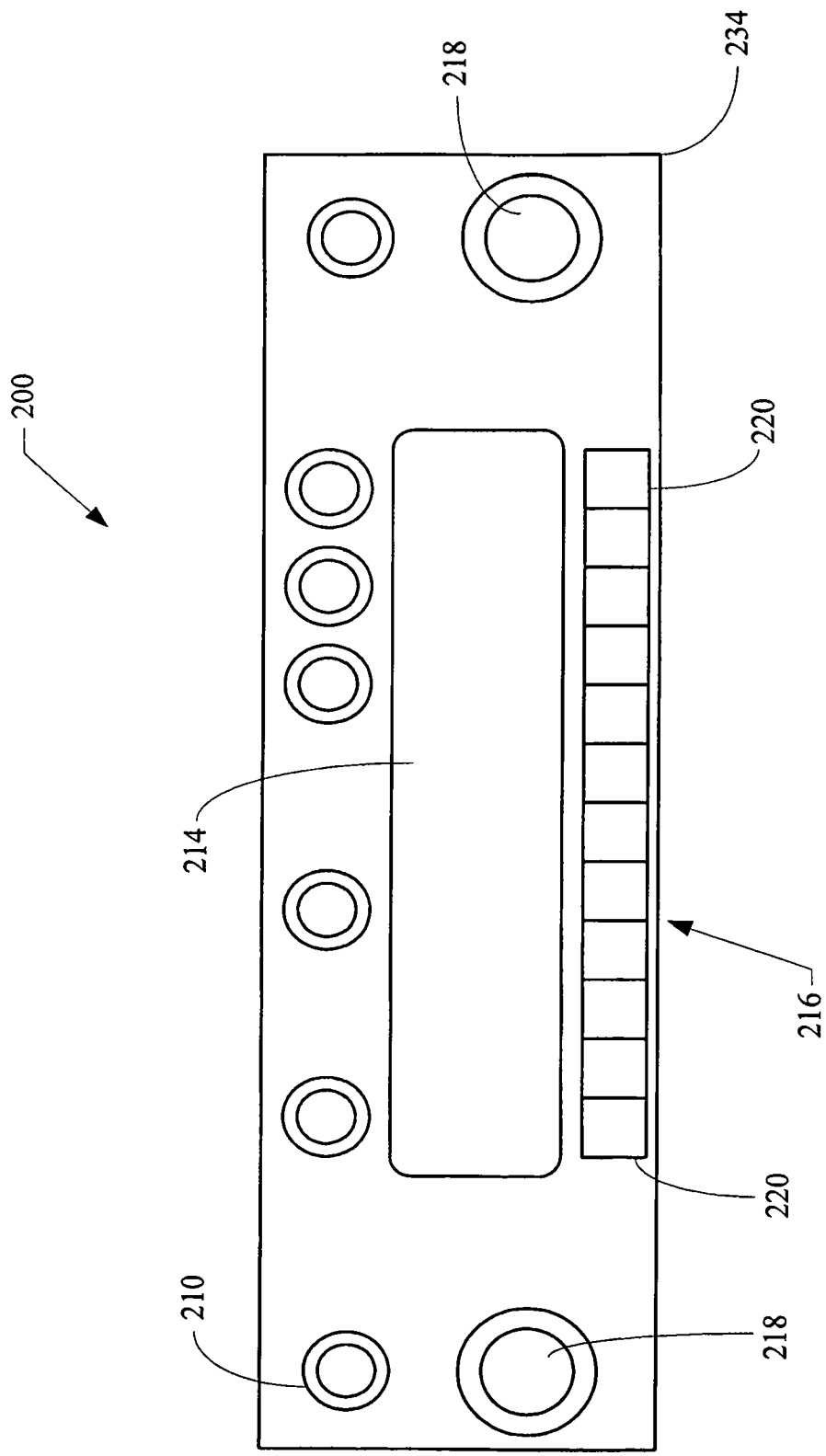
FIG. 2 is a schematic front view illustrating a vehicle multimedia system.

FIG. 2 illustrates a front view of a vehicle multimedia system 200. The system 200 includes a front panel 234 supporting a display 214 and an operating element 216. As shown in FIG. 2, the operating element 216 may include two rotary-push-button switches 218, eleven push keys 220, and seven push keys 210. Those skilled in the art, however, will recognize that the vehicle multimedia system 200 may have fewer or more buttons, switches, and/or keys depending on differing configuration and/or operability. The configuration and/or operability may depend on the intended design and operation of the vehicle multimedia system 100. The push keys 220 may operate as user-programmable keys or soft keys. Soft keys may be programmable and/or defined by users such that they are assigned to variable functions depending on a menu displayed on the display device 214. The push keys 210 may operate as hard keys. Hard keys may be assigned to a predetermined function. Hard keys may be factory-programmed to be assigned with a specific function. Alternatively, users may define or program a specific function to hard keys. Soft keys may be programmed to have variable and multiple functions, whereas hard keys may be assigned with a fixed function.

Although not shown, an enclosure may be provided to receive electronic components of the vehicle multimedia system 200, such as a control unit, a memory, and other devices. For example, the enclosure may include the central control unit 112, the memory 128, the hifi unit 122, the navigation unit 124, and the mobile telecommunications unit 126 of FIG. 1. Alternatively, the devices such as the hifi unit 122, the navigation unit 124, and the mobile telecommunications unit 126 may be separately installed from the enclosure when space is restricted.

In FIG. 2, users may operate the vehicle multimedia system 200 with the operating element 216, in particular, with switches 218 and the soft and hard keys 210 and 220. The switches 218 may be rotary and/or push button, or they may be activated by a touch panel, or other known type of switch. The vehicle multimedia system 200 offers a plurality of functions, services, and settings, which may be more than a number of switches. A menu system may be needed to make selection and activation of services, functions, and settings, as will be described in detail below.

Figure 3:
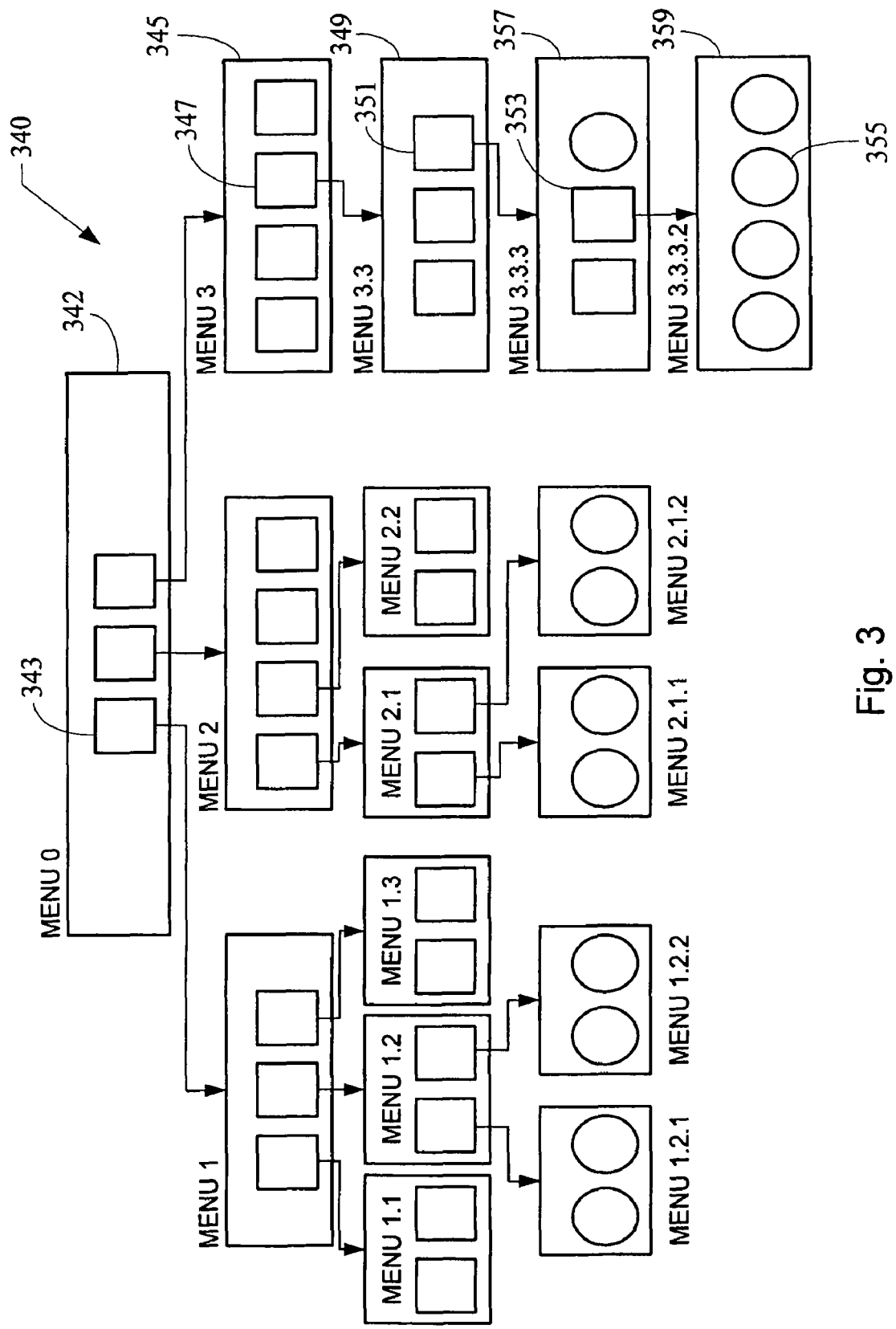
FIG. 3 is a block diagram of a hierarchically structured menu system.

FIG. 3 is a block diagram of a menu system 340 for use with the vehicle multimedia system 100 and 200. The menu system 340 is by way of example and various other menu systems are possible. The menu system 340 is hierarchically structured and includes a plurality of menu levels. In FIG. 3, for example, five menu levels are shown. Main menu 342, located on the main menu level shows, for example, Menu 0. The main menu 342 (Menu 0) has three menu items 343 that may be selected and activated by users. Users may operate an operating element such as one of switches 118 and 218 (FIGS. 1 and 2) to select and activate the menu items 343. In particular, a menu item of the main menu 342 may be displayed by a display device such as the display 114 (FIG. 1) and users may select the displayed menu item by rotating the switches 118 and 218. Alternatively, or additionally, users may activate the menu item by pushing the switches 118 and 218. The term, "menu" may include a group of menu items that are simultaneously presented to users for selection.

In FIG. 3, each menu item 343 branches down to menus in the next menu level, as indicated with arrows. A second menu level provides, for example, three menus, including Menu 1, Menu 2, and Menu 3. Each of the Menus 1, 2, and 3 has menu items that may be selected and activated by users. Users also may reach a third menu level, which includes a plurality of different menus having menu items, respectively, as shown in FIG. 3.

In FIG. 3, the menu items are illustrated with squares and circles. The square menu items may indicate menu items for opening a submenu, and the circular menu items may indicate menu items for performing a function. Alternatively, the square menu items may include both submenus and menu items that perform a function.

Figure 4:
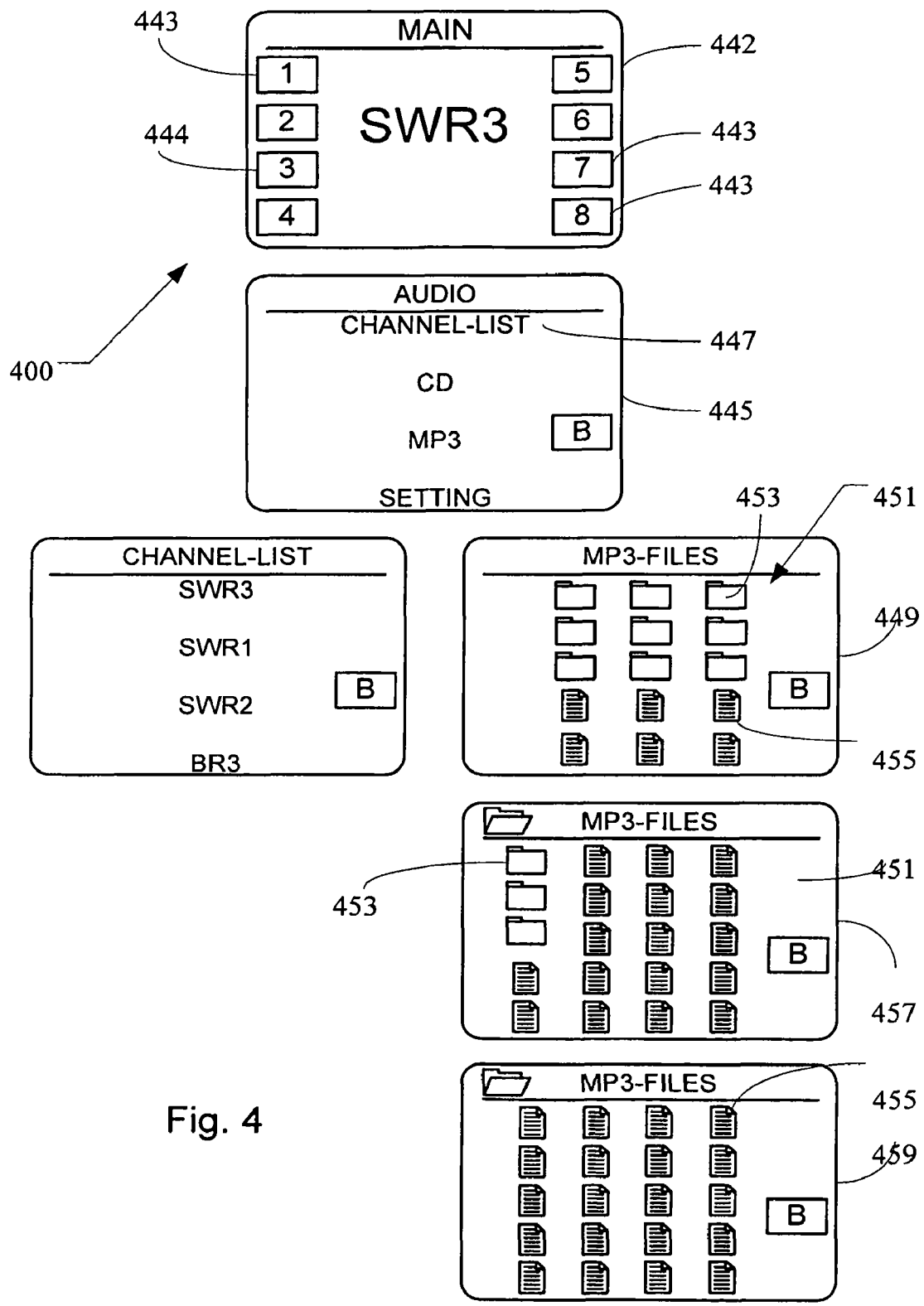
FIG. 4 illustrates one example of a hierarchically structured menu involving audio functions.

FIG. 4 illustrates a menu system 400 that includes menu and menu items involving audio functions. In FIG. 4, a display such as the display 114 of FIG. 1 displays the menu system 400. The main menu 442 may operate as a status screen showing necessary information, such as a selected radio station, field strength of a mobile module, etc. Further, the main menu 442 includes menu items 443 including eight items 1 to 8. Each menu item 443 operates to activate a specific service or function of a vehicle multimedia system such as the vehicle multimedia system 100 and 200. For example, a menu item 444 (item 3) may activate audio functions. When users select and activate the menu item 444, they reach a next menu 445. The term, "reach" may indicate jumping to a specific menu or menu item and displaying it on the display device or directly activating a function assigned to the menu item. This menu 445 includes menu items 447 that may be selected by users. For example, the menu item "MP3" may allow users to activate the MP3 function of an audio unit. Subsequently, users may select files to be played (see, e.g., 449, 457, and 459).

When users select and activate the menu item "MP3," they reach the menu 449 in the next menu level. Menu 449 may include a plurality of menu items 451 represented by icons, such as icons 453 for file directories and/or icons 455 for files. When users select and activate the directory icon 453, they may reach a next menu level 457. Menu 457 may present other menu items 451 represented in form of directory and file icons for selection and activation, as shown in FIG. 4. Activation of a directory menu item allows a next menu level to be reached. In this menu 459, file menu items may be presented for selection. When a menu is presented, such as 459, that does not include a directory menu item, then menu 459 is a hierarchical end of this menu branch. A displayed menu item 455 performs a function, e.g., playback of a selected MP3 file.

Users may choose not to operate the operating elements 116 and 216 (FIGS. 1 and 2) for a predetermined time period. For instance, users may encounter heavy traffic or dangerous road conditions that require their attention during driving. In that case, a control unit such as the control unit 112 of FIG. 1 may return the menu system 400 to the main menu 442. For example, in FIG. 4, when users navigate down to the menu 459 and do not select and activate any menu items 455 for a predetermined time period, the main menu 442 may be displayed again.

To avoid the repetitive navigation back to the menu 459 via the previously navigated menus, for example, 447, 449, and 457, a vehicle multimedia system such as the vehicle multimedia systems 100 and 200 may use a memory 128. In the example disclosed, the memory 128 includes two memory elements 130 and 132. The second memory element 132 was discussed in FIG. 1. The first memory element 130 of the vehicle multimedia system 100 now will be explained. The first memory element 130 stores information identifying menus. The information may include a last activated menu or menu item. Alternatively, or additionally, the information may include a specific menu navigation saved by users. This information may be retrieved by activating a predetermined operating element, for example, the keys 210 and 220 of FIG. 2. In response to the activation of the operating element, the control unit 112 receives this information and causes the display device 114 to display the menu corresponding to the retrieved information. In this manner, users may directly reach, for example, the last accessed menu or the saved menu.

Figure 5:
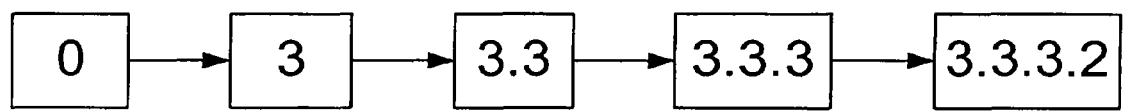
FIG. 5 illustrates content of a memory during navigation with the menu system of FIG. 3.

FIG. 5 illustrates content of the first memory element 130 of FIG. 1. The function of the first memory element 130 and its content are described with reference to FIGS. 3 and 5. By way of example, users have navigated from the main menu 342 to the menu 359 via the menu 345, 349, and 357. Further, users have activated a specific menu item 355 in the menu 359.

In FIG. 5, the first memory element 130 stores information identifying a menu, for example, so that users may return to that menu at a later time from anywhere in the menu system. The memory control unit 113 stores the value "0" identifying the main menu 342 in response to an activation of the menu item 343 of this menu 342. Then, upon activation of the menu item 347 of menu 345, the memory control unit 113 writes information "3" identifying the menu 345 (Menu 3). When users select the menu 349 (Menu item 3.3 in FIG. 3) and activate a key such as the key 220 of FIG. 2, the menu 345 may be displayed. The activation of the key at a later time causes a return to the last accessed menu. Alternatively, or additionally, the activation of the key may cause a return to the user saved menu. In response to the activation of the menu item 351 of the menu 349 (Menu 3.3), the information 3.3 identifying this menu 349 is stored in the first memory element 130. Then, the information 3.3.3 identifying the menu 357 (Menu 3.3.3) is stored in the first memory element 130 in response to the activation of the menu item 353 of this menu 357.

At this stage, the display 114 (FIG. 1) shows the menu 359. When users do not select and/or activate the menu system 340 for a certain period, the control unit 112 may return to the main menu 142 and drive the display 114 to display the main menu 342. If users operate the operating element 116, the memory control unit 113 reads the value stored in the first memory element 130, i.e., information "3.3.3" identifying the menu 357, and returns to the respective menu 357. Users now are able to proceed further with the selection of MP3 files, or other vehicle multimedia selections, without a repetitive navigation through the whole menu branch. Users may reach the menu 359 by activating the menu item 353. Once menu item 355 has been selected and activated, the information "3.3.3.2" identifying the menu 359 (Menu 3.3.3.2 in FIG. 3) is stored in the first memory element 130.

As a result, the memory control unit 113 operates to track the activated menu that includes the last activated menu item or the saved menu item. The memory control unit 113 ensures that the respective value of the last activated menu or the saved menu item is written into the first memory element 130. Further, the memory control unit 113 ensures that this value is read out of the first memory element 130 in response to the activation of the keys 210 and 220, so that the menu identified by the retrieved information from the first memory element 130 is displayed on the display device 114.

Alternatively, or additionally, the memory control unit 113 may perform filtering with storage of menus and menu items. In particular, not every activated menu or menu item is stored in the first memory element 130. Rather, menus or menu items that correspond to a predetermined criterion, may be stored. For example, the memory control unit 113 may store only the menu or menu item that has been used for activation of a function. The memory control unit 113 may not store the menu or menu items that are used to jump to the next submenu. In FIG. 3, the menus 345, 349, and 357 may not be stored because the selected and activated menu items of these menus only lead to the next level menu (submenu). Accordingly, the menu 359 may be stored if the menu item 355 is selected and activated, but menu 359 may not be stored if the menu item 355 is not selected and activated. Alternatively, the memory control unit 113 may store the menu 359 if the system returns to the main menu 342 after lapse of a timeout period, although the menu item 355 has not been activated.

Figure 6:
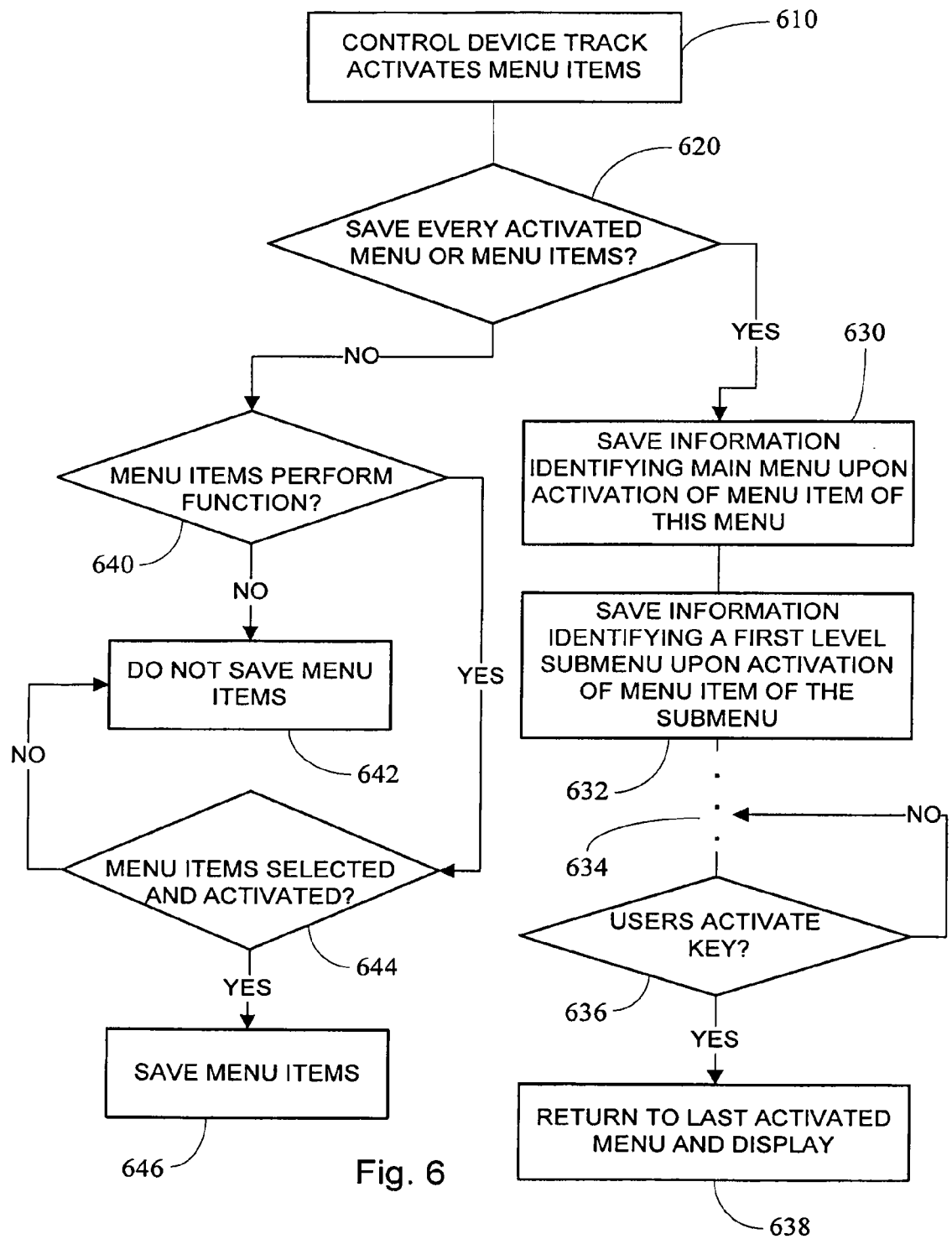
FIG. 6 is a flowchart illustrating a tracking process of a menu or menu items.

FIG. 6 is a flowchart illustrating a tracking process of menus or menu items by the control unit 112. The control unit 112 operates to track activated menus or menu items, as shown at 610. Users may want to recall navigation to a particular menu or menu item, and hence, may select to save every activated menu or menu item in the path to the desired menu or menu item. Alternatively, users may select to save some of the activated menu or menu items, as shown at 620. When users select to save every activated menu or menu item, the control unit 112 operates to save information identifying a main menu upon activation of one of the menu items that belong to the main menu, as shown at 630. Upon activation of the menu item, the menu automatically leads to a first level submenu. Upon activation of one of menu items in the first level submenu, the memory control unit 113 operates to save information identifying the first level submenu, as shown at 632. The activation of the menu item of the first level submenu automatically leads to a second level submenu and this process may be repeated until the menu may reach a menu item of a hierarchically lowest menu, as shown at 634. Alternatively, or additionally, users may activate a key such as the keys 210 and 220 of FIG. 2. Upon activation of the key by users, the control unit 112 stops tracking and returns to the last activated menu, as shown at 638. A display device such as the display 114 of FIG. 1 displays the last activated menu. When no selection or activation of the menu or menu items is made for a certain time period, the display 114 may display the main menu 342. Users may operate the key to retrieve the last accessed menu.

In FIG. 6, when users activate the key, the last activated menu may be retrieved and displayed, as shown at 638. Alternatively, users may desire to save certain menu navigations for various reasons, such as because they arrive at their destination, they are interrupted by traffic, phone, etc, or they may desire to repeat the menu navigation, etc. A key of an operating element such as the keys 210 and 220 may be used to save and/or retrieve menu navigation paths. Users may program or define the key to perform saving and/or retrieving functions.

When users select to save only some of activated menu or menu items, for example, due to limited storage, the control unit 112 may apply specific criteria to determine which menu or menu items to be saved. By way of example, the control unit 112 may determine whether menu items perform a certain function, as shown at 640. According to the criteria, menu items performing no functions, such as those that lead to a submenu, may not be saved, as shown at 642. When a menu item performs a certain function, the control unit 112 determines whether the menu item is selected and activated, as shown at 644. Then, the selected menu items may be saved. If the menu item is not selected and activated, the menu item may not be saved, as shown at 642.

Figure 7:
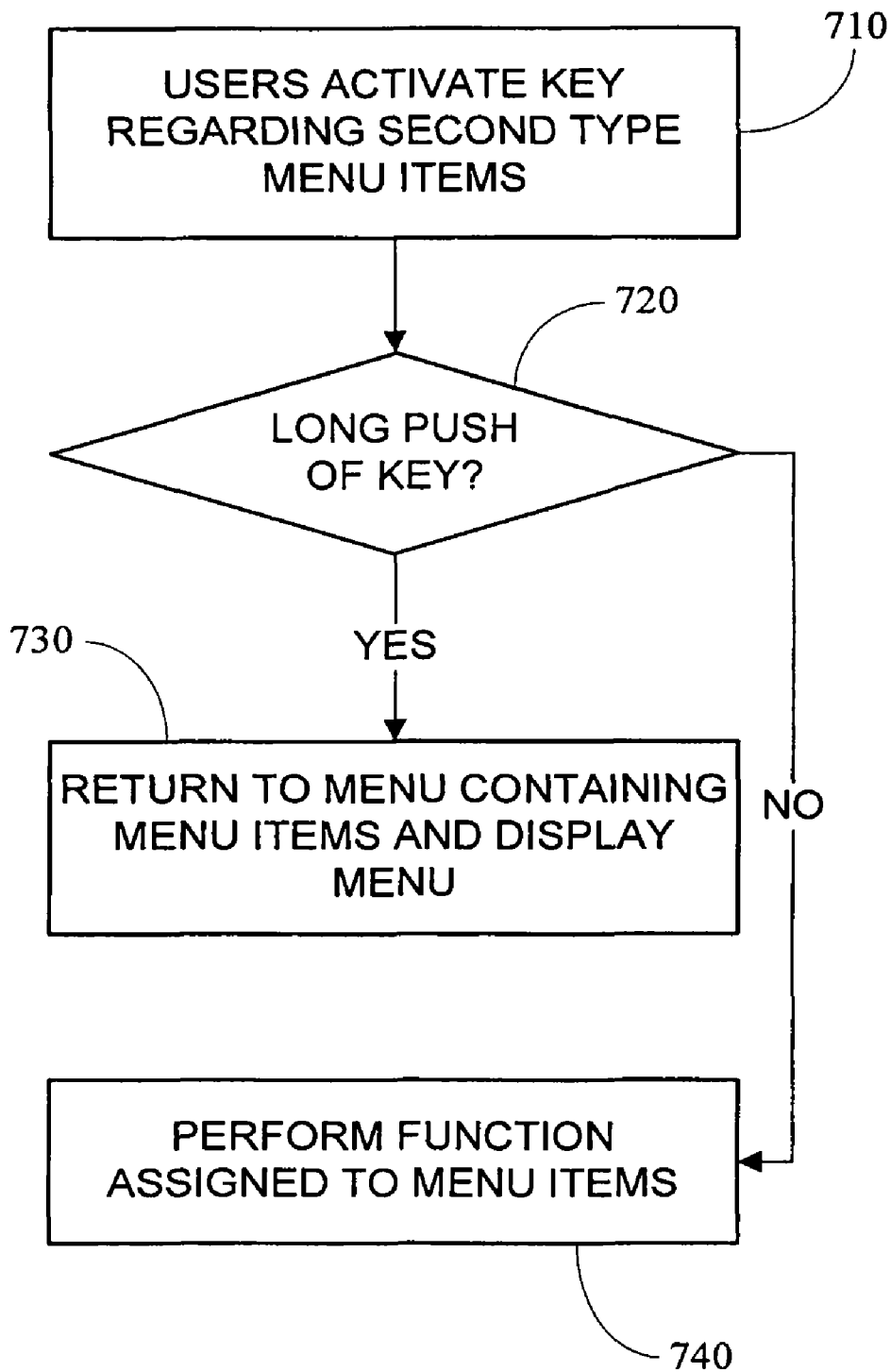
FIG. 7 is a flowchart illustrating activation of a key.

As described above in conjunction with FIG. 3, there are at least two different types of menu items. The first type of menu items may provide for jumping to a submenu (indicated as squares in FIG. 3), and the second type of menu item may perform a function (indicated as circle in FIG. 3). FIG. 7 is a flowchart illustrating activation of a key with respect to the second type of menu item. The key may offer to users first and second actions upon activation. Upon selection by users of the first action, the activation of the key may cause the system to return to a menu containing the menu item, as shown at 730. In FIG. 3, the activation of the key results in return to and display of menu 359 (Menu 3.3.3.2) containing the stored "menu item 355." Alternatively, the activation of the second action may result in performance of functions assigned to this specific menu item, as shown at 740. In FIG. 3, the activation of the key results in the playback of the respective MP3-file indicated by menu item 355. For example, users may select one of the actions with a long push and the other action with a short push of the key, as shown at 720. When users push the key for a long time period, the first action is performed, as shown at 730. When the key is pushed for a short time period, the second action is performed, as shown at 740. Other known methods of distinguishing between activation of a first and second action may also be used such as turning the key to the left for one and to the right for the second, etc.

In FIG. 7, the key may be either a soft key or a hard key. The hard key may be factory programmed to perform a certain function such as retrieving the stored information from a memory and displaying the last accessed menu or menu item on a display device. Users may program a soft key to perform a function or that same function may be programmed or preprogrammed in the hard key. Soft keys may be programmed to support and activate various functions provided by the menu system 340 and 400. Keys may be designed and installed so that they are ergonomically convenient and accessible to users. Users often may use keys while driving and ergonomic design and structure of keys may increase safety level of a vehicle.

The memory control unit 113 may store information about a menu or menu item in two different ways, i.e., saving it as a link and/or as a reference. When a link is stored, an activation of the link with the key causes the system to display each menu and the menu containing the menu item, respectively. When a reference is stored, activation of the reference with the key may cause the system to directly perform the function assigned to the menu item.

Figure 8:
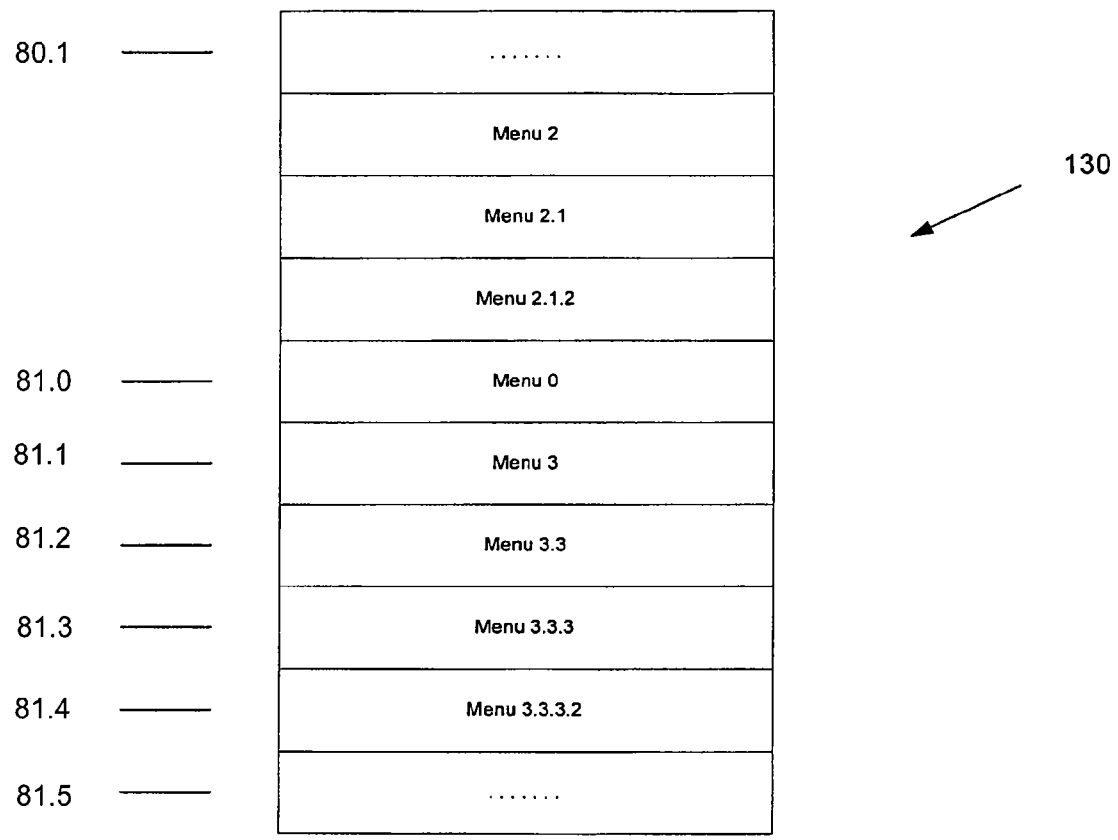
FIG. 8 is a schematic diagram of the memory element storing the last activated menus.

FIG. 8 illustrates the first memory element 130 with a plurality of memory cells. The memory control unit 113 may store the value "0" identifying the main menu 342 in response to an activation of a menu item of this menu 342. For storing this information, the memory control unit 112 may select a memory cell 801. The memory control unit 113 may increment a counter value "n" which may be increased by 1 after each storing process. If the counter value n reaches the maximum value "m," the counter value n is set to 0. The information stored in memory cell 801 may be overwritten by a new piece of information if the preceding memory cell was the "m"th memory cell after memory cell 801 (815 in this example). The first memory element 130 may be organized as ring memory.

After storing the value "0" identifying the main menu 342 in memory cell 810, the counter value n may be increased by one and then, upon activation of a menu item 347 of menu 345, the memory control unit 113 may write the information "3" identifying the menu 345 (menu 3 in FIG. 3) in memory cell 811. In response to the activation of menu item 351 of menu 349 (menu 3.3), the information "3.3" identifying the menu 349 is stored in the next cell 812 of the first memory element 130. Then, the information 3.3.3 identifying the menu 357 (menu 3.3.3 in FIG. 3) is stored in the next memory cell 813 in response to the activation of menu item 353 of this menu. If the user then selects and activates a menu item 355 in the menu 359, the information "3.3.3.2" identifying the menu 359 (menu 3.3.3.2 in FIG. 3) is stored in the memory element 130, namely in memory cell 814.

Figure 9:
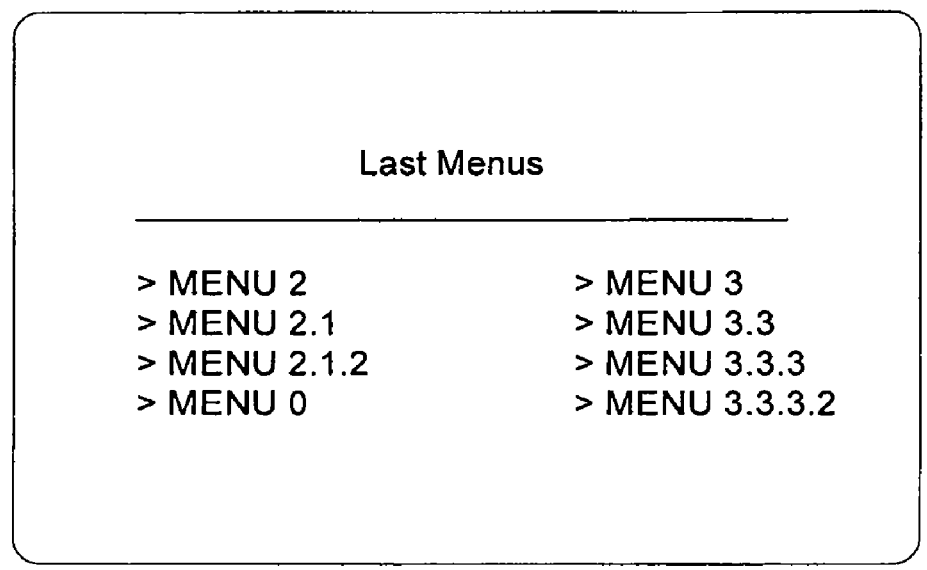
FIG. 9 is a schematic diagram of a menu including the last activated menus as menu items.

If the user does not operate the operating element 116 within a predetermined time period (timeout period), the control unit 112 returns back to the main menu 342. If the user now operates the hard key 210, the memory control unit 113 reads all the values stored in the memory element 130 and displays these values within a specific menu 900, which is shown in FIG. 9 and which is referenced as "last menus." All values of memory cells 801 to 815 are displayed as selectable and activatable menu items. This menu allows the user to select one of these menu items, for example the menu item "menu 3.3" and to activate the menu item by operating the switch 218. In response to this activation, the respective menu 349 is displayed on the display device 114.

Figure 10:
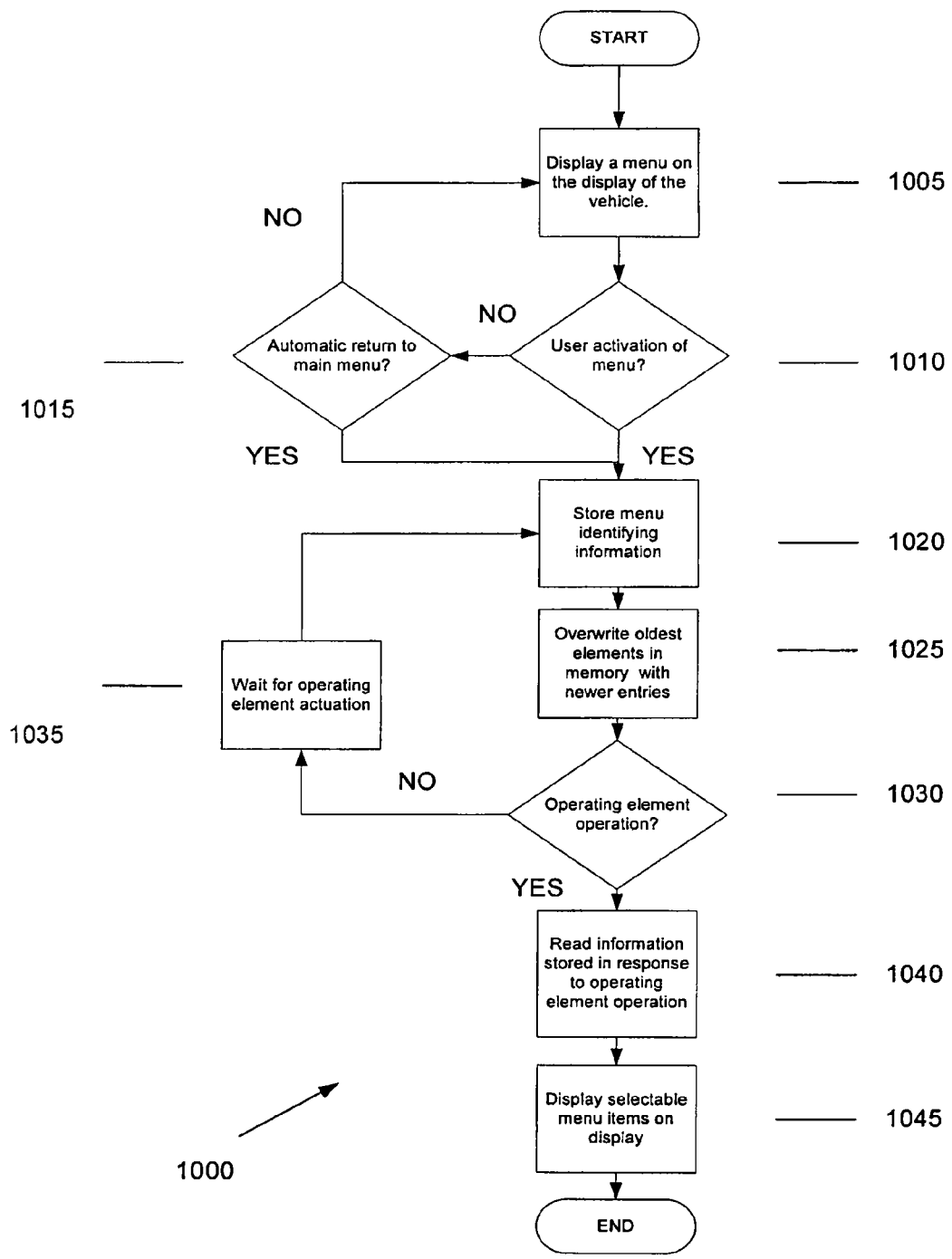
FIG. 10 is a flowchart illustrating display of menu items in response to operation of an operating element.

FIG. 10 illustrates a method 1000 for displaying menus or menu items in response to operation of an operating element 116. The control unit 112 may display a menu on the display device 114, as shown in 1005. At block 1010, the control unit 112 may determine if the user has activated a menu. If the user has not activated a menu, the control unit 112 may determine if there has been an automatically-caused return to a predetermined menu, such as the main menu, as shown in 1015. If there has not been an automatically-caused return to a predetermined menu, the control unit 112 may display a menu as in block 1005. If there has been an automatic return to a predetermined menu, or if the user has activated a menu, the memory control unit 113 may store information identifying the displayed menu or menu item, as shown in 1020. The memory control unit 113 may replace older entries stored in the first memory element 130 with newer entries, as implemented in a ring memory as shown in 1025.

The control unit 112 then may determine if the user has actuated the operating element 116 at block 1030. If the user has not actuated the operating element 116, the control unit 112 may wait for the user to interact with the operating element 116, as shown in 1035. If the user actuates the operating element 116, for example to select a menu or menu item, the memory control unit 113 may read predetermined information stored in the memory element 130, as shown in 1040. Examples of the information include, for example, menu level listings. At block 1045, the control unit 112 may display the read pieces of information as selectable and activatable menu items on the display device 114. The user's selection and activation of the menu item allows the display of the menu or menu item identified by the information.

The vehicle multimedia system 100 and 200 may control the display of the hierarchically structured menus 340 and 400 on the display 114 with improved ergonomics. The mechanism of reaching the last accessed menu or menu item has a particular advantage when the control unit 112 is operated to return to a predetermined menu upon no selection or activation of users for a predetermined time period, i.e., timeout period. The predetermined menu may be the main menu 342 and/or 442. The displayed information on the display 114 returns back or returns to the main menu 342 and/or 442, which may be referred to as a status screen. The status screen with the most important status information may be displayed without any delay after the selection and activation of any menu item without inconvenience to users. For example, users may choose not to operate the operating elements 116 and/or 216 to return to the main menu 342 and/or 442. Hence, the display 114 may not remain on the selected and activated menu, but rather, may return to the informative menu (status screen) that is more valuable for users. The memory 130 may store the information identifying the selected and activated menu or menu items. The stored information may be retrieved from the memory 130 upon activation of the operating elements including switches and/or keys. Subsequently, users may quickly reach a specific menu or menu item corresponding to the retrieved information, such as the last accessed menu or the saved menu.

Like the method shown in FIGS. 6, 7, and 10, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the control unit 112 or memory control unit 113, a communication interface, or any other type of non-volatile or volatile memory interfaced or resident to the control unit 112 or memory control unit 113. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The vehicle multimedia system may be adapted for use in different mobile vehicle platforms. Vehicles may include any device or structure for transporting persons or things. These multimedia systems may be used in portable systems or on vehicles such as automobiles, trucks, farming equipment, mining equipment, golf carts, motorized off-road vehicles, motorcycles, mopeds, and mobile robots. These multimedia systems may also be used in sea-borne or air-borne vehicles such as ships, airplanes, helicopters, spacecraft, balloons, and gliders.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A vehicle multimedia system, comprising:
   a display for displaying menus and menu items of a hierarchical menu structure, each menu comprising one or more menu items, wherein upon activation of a menu item, a submenu is reached or a function assigned to activated the menu item is performed;
   a first operating element operable by a user;
   a control unit adapted to select and activate a menu item of the hierarchical menu structure in response to receiving a signal from the first operating element;
   a memory adapted to store a last menu item activated by the control unit in response to an actuation of the first operating element or a menu comprising the last activated menu item or both,
   where the memory is further adapted to:
      store the last activated menu item or the menu comprising the last activated menu item if the last activated menu item is associated with the function; and
      forgo to store the last activated menu item or the menu comprising the last activated menu item if the last activated menu item is associated with reaching a submenu; and
   a second operating element operable by a user;

where the control unit is further adapted to:
in response to an operation of the second operating element, retrieve the last activated menu item or the menu comprising the last activated menu item stored in memory, and activate the retrieved menu item, or display the retrieved menu on the display;
select a menu item that belongs to a hierarchically higher menu;
automatically leading to an displaying a first submenu;
selecting a menu item that belongs to the first submenu;
automatically leading to and displaying a second submenu hierarchically lower than the submenu; and
tracking only a menu comprising the activated menu item, only the activated menu item, or both.

2. The vehicle multimedia system of claim 1, where the display operates to display the retrieved menu upon activation of the second operating element which comprises a hard key or a soft key where the hard key is configured to be assigned with a factory programmed function and the soft key is configured to be assigned with a user programmed function.

3. The vehicle multimedia system of claim 1, further comprising a memory control unit operable to:
write a respective value corresponding to each menu of the hierarchical menu structure into the memory;
read the respective value from the memory; and
where the respective value is output from the memory in response to activation by the first or the second operating element to present simultaneously all menus stored in memory with the different hierarchy as selectable and activatable at a later time.

4. The vehicle multimedia system of claim 3, where the memory is operable to store information selected based on predetermined criteria under the control of the control unit, the predetermined criteria comprising storing in the memory the menu or menu item that has been used for activation of a function.

5. The vehicle multimedia system of claim 3, where the memory stores only the respective value corresponding to the last activated menu item or a menu comprising the last activated menu item.

6. The vehicle multimedia system of claim 2, where the display operates to display a menu indicating status information when no signal is received that selects and activates the menu or menu item from the user during a predetermined time period.

7. The vehicle multimedia system of claim 1 where the first operating element, the second operating element, or both comprise at least one rotary-push button key for selecting and activating a menu.

8. The vehicle multimedia system of claim 1 where the first operating element, the second operating element, or both comprise at least one push key for selecting and activating a menu.

9. The vehicle multimedia system of claim 1 where the control unit operates to control a selected menu item to perform an assigned function upon activation of the first operating element or the second operating element, or both,
where the first and the second operating elements comprise a hard key, a soft key, or both where the hard key is configured to be assigned with a factory programmed function and the soft key is configured to be assigned with a user programmed function.

10. The vehicle multimedia system of claim 1 further comprising:
a hifi unit comprising an audio unit including at least an amplifier, a radio tuner, or a CD/DVD player where the control unit drives the audio unit in response to the signal from the first operating element, the second operating element, or both.

11. The vehicle multimedia system of claim 1, further comprising:
a navigation unit supplying a route guidance; and
a mobile communication unit supplying telephone and internet service; and where the control unit drives at least one of the navigation unit or the mobile communication unit in response to the signal from the first operating element, the second operating element or both.

12. A method for operating a vehicle multimedia system, comprising:
displaying on a display menus and menu items of a hierarchical menu structure, each menu comprising one or more menu items, where upon activation of a menu item, a submenu is reached or a function assigned to the activated menu item is performed;
receiving a signal from a first operating element operable by a user;
selecting and activating with a control unit a menu item of the hierarchical menu structure in response to the received signal;
storing at a memory a last menu item activated by the control unit in response to an actuation of the first operating element, a menu comprising the last activated menu item, or both;
where storing the last activated menu item comprises:
storing the last activated menu item or a menu comprising the last activated menu item if the last activated menu item is associated with a function; and
forgoing to store the last activated menu item or a menu comprising the last activated menu item if the last activated menu item is associated with reaching a submenu;
receiving a signal from a second operating element operable by the user;
retrieving by the control unit the last activated menu item in response to an operation of the second operating element or a menu comprising the last activated menu item stored in memory; and
activating the retrieved menu item or displaying the retrieved menu on the display;
executing the hierarchical menu structure by:
selecting a menu item that belongs to a hierarchically higher menu;
automatically leading to an displaying a first submenu;
selecting a menu item that belongs to the first submenu;
automatically leading to and displaying a second submenu hierarchically lower than the submenu; and
tracking only a menu comprising the activated menu item, only the activated menu item, or both.

13. The method of claim 12 where retrieving by the control unit comprises retrieving the last activated menu item or a menu comprising the last activated menu item when a menu different from the menu comprising the last activated menu item is displayed.

14. The method of claim 12 where retrieving by the control unit comprises retrieving the last activated menu item or a menu comprising the last activated menu item upon activation of the second operating element which comprises a hard key or a soft key, the hard key configured to be assigned with a factory programmed function and the soft key configured to be assigned with a user programmed function.

15. The method of claim 12 further comprising:
returning to the hierarchically higher menu upon no selection of a menu item for a predetermined time period; and
upon activation of the second operating element, displaying a menu comprising the last activated menu item.

16. The method of claim 12 further comprising activating a menu item that belongs to a hierarchically lowest submenu to perform the function of the menu item.

17. The method of claim 12 where retrieving by the control unit further comprises retrieving and displaying a hierarchically lowest menu of the menus navigated by the user.

18. The method of claim 12 where activating the retrieved menu item further comprises performing a function assigned to the last activated menu item upon operation of the second operating element.

* * * * *

UNITED STATES PATENT AND TRADEMARK OFFICE
CERTIFICATE OF CORRECTION

| | |
|---|---|
| PATENT NO. | : 8,161,404 B2 |
| APPLICATION NO. | : 11/212494 |
| DATED | : April 17, 2012 |
| INVENTOR(S) | : Kolletzki |

It is certified that error appears in the above-identified patent and that said Letters Patent is hereby corrected as shown below:

In FIG. 5, the memory element should be labeled with reference numeral 130.

In FIG. 8, the memory element should be labeled with reference numeral 130.

At column 1, line 25, "...and/orCD/DVD players..." should be changed to
-- and/or CD/DVD players --.

At column 3, line 59, "...vehicle multimedia system 100..." should be changed to
-- vehicle multimedia system 200 --.

At column 4, line 34, "...a menu item of..." should be changed to -- a menu item 343 of --.

At column 4, line 38, "...the menu item by..." should be changed to -- the menu item 343 by --.

At column 7, line 6, "...a key such as..." should be changed to -- a key, as shown at 636, such as --.

At column 7, line 35, "...may be saved. If..." should be changed to -- may be saved,
as shown at 646. If --.

At column 7, line 44, "...of menu item. The..." should be changed to -- of menu item,
as shown at 710. The --.

At column 10, lines 49–50, claim 1, "...assigned to activated the menu item..." should be changed to
-- assigned to the activated menu item --.

Signed and Sealed this
Twenty-ninth Day of January, 2013

David J. Kappos
*Director of the United States Patent and Trademark Office*